Jan. 22, 1957    J. A. ULLOA    2,778,294
HOLDER FOR COOKING TACO-SHELLS
Filed Sept. 2, 1954
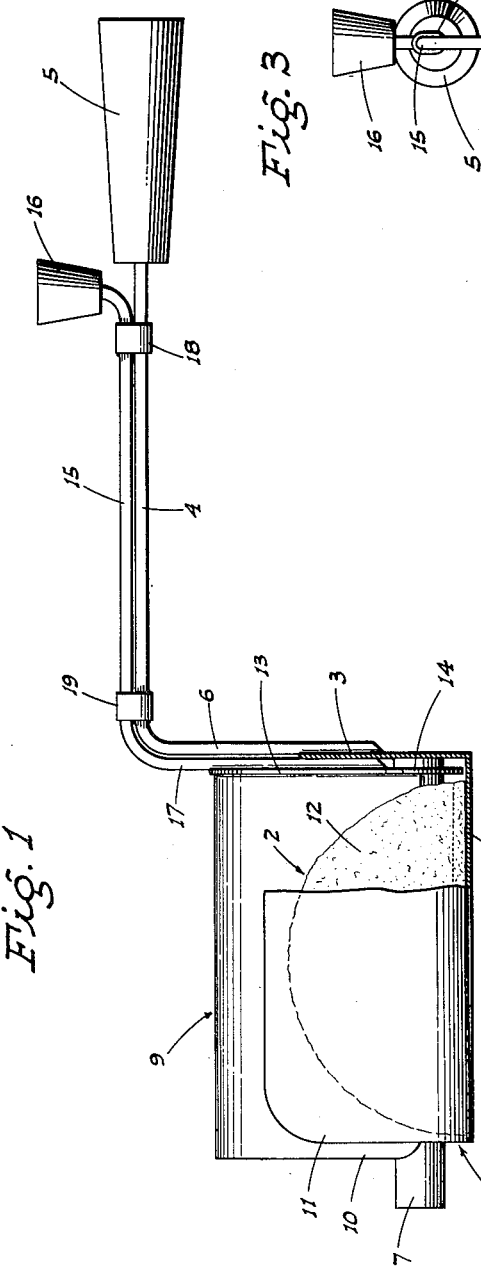
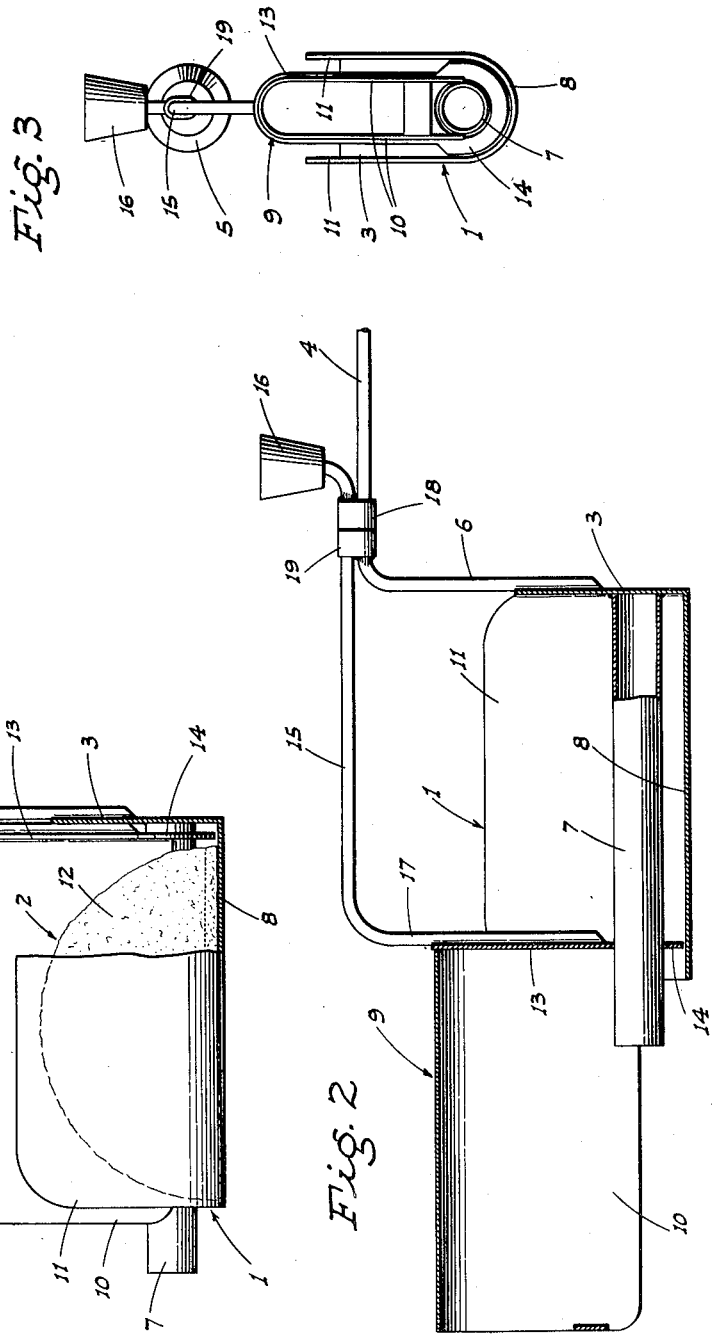
INVENTOR
Joseph A. Ulloa
BY
ATTORNEYS

United States Patent Office 2,778,294
Patented Jan. 22, 1957

2,778,294

HOLDER FOR COOKING TACO-SHELLS

Joseph A. Ulloa, Riverbank, Calif.

Application September 2, 1954, Serial No. 453,879

7 Claims. (Cl. 99—426)

This invention relates to a cooking utensil for preparing the shells or tortillas used in the making of Mexican food known as "tacos," and which is finding increased favor in the United States.

The shells are initially in the form of limp or flexible, thin pan-cakes or tortillas, usually made of corn meal, and these cakes must be in a crisp and folded-over condition and form before they can be used for tacos.

It is therefore the principal object of my invention to provide a novel holder for such a flexible shell, and by means of which holder the shell may be maintained in the necessary folded-over or U-shaped form while it is immersed in deep fat for frying and crisp cooking.

A further important object of this invention is to incorporate means in the holder for readily ejecting the fried and cooked shell therefrom, without the necessity of the hot shell being touched by hand during the ejecting process, or having to use a fork or other implement to remove the cooked shell from the holder.

It is also an object of the invention to provide a holder, for the purpose described, which is simple yet durable in structure; the holder being designed for ease and economy of manufacture and convenience of use.

Still another object of the invention is to provide a practical and reliable holder for cooking taco shells, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the holder, partly broken away in section, showing the holder in a contracted position for cooking of a taco shell, and with a shell supported therein.

Fig. 2 is a similar view, mainly in section, showing the parts of the holder in an extended position for discharge of a taco shell after the same has been cooked.

Fig. 3 is a front end elevation of the holder.

Referring now more particularly to the drawings, and to the characters of reference marked thereon, the holder comprises a relatively narrow and deep U-shaped body member 1, of stainless steel sheet or the like, of a sufficient height and length to fully enclose a taco shell 2 when the latter is folded over into U-form, as shown in Fig. 1. The body or shell support 1 is freely open at its front end, but is closed at its rear end by a back wall 3. A rod 4, terminating in a handle 5, extends rearwardly from and above the body 1 in parallel relation to the body both lengthwise and transversely; said rod, at its forward end, being formed with a depending portion 6 rigidly secured to the back wall 3, as indicated.

A cylindrical member 7, preferably tubular for the sake of lightness, is secured to and projects forwardly from the back wall 3 concentric to the curved bottom portion 8 of the body 1. The member 7 extends to a termination a short distance beyond the forward end of the body so that said member may serve as a guide for a taco shell as the latter is being inserted into the body 1.

Normally within and extending lengthwise of the body 1 is an inner taco shell locator and ejector member 9. This member is of inverted U-shape and hollow for the sake of lightness, and includes depending sides 10 overlapping the member 7 on opposite sides thereof in somewhat close relation thereto. Said sides terminate at their lower end substantially in the horizontal diametral plane of the member 7, as shown in Fig. 3; the member 9 as a whole extending above the body 1 and beyond the forward end thereof a short distance when said member 9 is fully contracted within the body 1, as shown in Fig. 1. The depending sides 10 of member 9 are parallel to the upstanding side walls 11 of the body 1; adjacent walls being spaced apart a distance greater than the thickness of a taco shell, and together providing means for holding the sides 12 of the folded taco shell in an upright and substantially parallel position.

The member 9 is rigid with a back wall 13, which— at its lower end—is enlarged in width, as shown at 14, and slidably embraces the member 7. Portion 14, whose peripheral edge is close to and parallels the adjacent inner face of body 1, forms a push-out flange for a taco shell supported in the body.

A control rod 15 for member 9 parallels rod 4 immediately above the same, and at its rear end—which is normally adjacent the forward end of the handle 5— is provided with an upstanding knob 16. Rod 15 is formed, at its forward end, with a depending portion 17 rigidly secured to the back wall 13, as shown. Rod 15 is guided for movement along the rod 4, so as to shift the member 9 lengthwise relative to the body 1, by means of a sleeve 18 secured to the rod 15 adjacent knob 16 and slidable through rod 4, and another sleeve 19 secured on rod 4 near depending portion 6 and through which rod 15 is slidable.

The sleeves obviously limit the extent of projection of member 9 from the body 1 when said sleeves contact each other upon advance of the knob 16 and sleeve 18 along the rod 4. When the sleeves so contact each other, the member 9 is practcally fully projected from the body 1, so that the push-out flange 14 is adjacent the forward end of the body, as shown in Fig. 2.

In operation, a taco shell is first prepared, as usual, in the form of a relatively thin pan-cake or tortilla. With the member 9 fully retracted in the holder, the pan-cake is then folded over into a U-shaped form and in that form is slid into the holder to assume an enclosed position therein, as shown in Fig. 1.

The shell-supporting portion of the holder is then dipped into the pan of cooking or frying fat, for the necessary cooking period; the operator holding the handle 5, until the shell is in a crisp and relatively rigid condition. The holder is then removed from the fat and shifted so that its discharge end is laterally clear of the pan. The knob 16 is then pushed forward, which causes the ejector flange 14 to engage the inner end of the shell 2 at its curved bottom portion, sliding the shell 2 clear of the holder. The shell may then be handled and filled with the necessary material to form the finished taco.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A holder for cooking a taco shell comprising a U-shaped support open at its forward end and of a length and height sufficient to contain a shell to be cooked in a U-shaped folded form, a transverse back wall provided with the support, a handle member above and connected to the backwall, the support including a transversely curved bottom portion, a cylindrical member projecting forwardly from the back wall in parallel and concentric relation to said curved bottom portion of the support and spaced therefrom a distance greater than the thickness of a shell, and means mounted in the support to engage and eject a shell from the support and including a transverse flange element slidable on said cylindrical member.

2. A holder for cooking a taco shell comprising a U-shaped support open at its forward end and of a length and height sufficient to contain a shell to be cooked in a U-shaped folded form, a transverse back wall provided with the support, a handle member above and connected to the back wall, the support including a transversely curved bottom portion and upstanding spaced and parallel side walls, a shell locating member normally disposed within the support and including side walls parallel to and spaced from the side walls of the support, means mounting said member in connection with the support for longitudinal sliding movement relative thereto, and a shell engaging and ejecting element on the member at its rear end and disposed adjacent the bottom of the support.

3. A holder for cooking a taco shell comprising a U-shaped support open at its forward end and of a length and height sufficient to contain a shell to be cooked in a U-shaped folded form, a transverse back wall provided with the support, a handle rod extending away from and parallel to the bottom of the support above the same, an extension on the forward end of the rod depending and secured to the back wall, a transversely disposed member mounted in the support and including a shell-engaging and ejecting element disposed adjacent the bottom of the support and normally disposed adjacent the rear end thereof, and means mounting said element in slidably supported relation from said handle rod.

4. A device, as in claim 3, in which said last named means comprises a second handle rod extending parallel to and alongside the first named handle rod, means mounting the rods in connection with each other for relative sliding movement through a stroke of predetermined length, a knob on said second named rod for manipulating the same, and connecting means between the forward end of the second handle rod and the ejecting element; said knob projecting laterally out from the outer end of said second rod and being disposed short of the outer end of the first named rod when the ejecting element is adjacent the rear end of the support.

5. A holder, as in claim 1, in which the cylindrical member projects outwardly beyond the forward end of the support.

6. A holder, as in claim 2, in which said element comprises a back wall on the member projecting laterally out from the side walls of the member to adjacent the side walls of the support.

7. A holder for cooking a taco shell comprising a U-shaped support open at its forward end and of a length and height sufficient to contain a shell to be cooked in a U-shaped folded form, a transverse back wall provided with the support, a handle rod extending away from and parallel to the bottom of the support above the same, a rigid longitudinal element in the support adjacent the bottom thereof and parallel thereto, a shell locating member normally disposed within the support and including side walls parallel to and spaced from the side walls of the support, a shell engaging and ejecting flange on said member at its rear end and adjacent the bottom of the support, and means mounting said member on said element and on the handle rod for guided longitudinal movement in the support.

References Cited in the file of this patent
UNITED STATES PATENTS

| 120,151 | Davison | Oct. 24, 1871 |
| 937,829 | Little | Oct. 26, 1909 |
| 2,503,318 | Bienert | Apr. 11, 1950 |
| 2,614,483 | Scofield | Oct. 21, 1952 |
| 2,635,528 | Torres | Apr. 21, 1953 |
| 2,664,812 | Molina | Jan. 5, 1954 |